United States Patent [19]

Roychoudhury

[11] Patent Number: 4,517,120

[45] Date of Patent: May 14, 1985

[54] COFFEE OIL TREATMENT

[75] Inventor: Rathindra N. Roychoudhury, Marysville, Ohio

[73] Assignee: Nestec, S.A., Vevey, Switzerland

[21] Appl. No.: 543,401

[22] Filed: Oct. 19, 1983

[51] Int. Cl.³ .............................................. C07G 17/00
[52] U.S. Cl. ..................................... 426/655; 426/425
[58] Field of Search ...................................... 260/236.5

[56] References Cited

U.S. PATENT DOCUMENTS 4,156,031 5/1979 Hamell et al. ........................ 426/541
4,323,514 4/1982 Dieffenbacher .................. 260/412.3

Primary Examiner—Albert T. Meyers
Assistant Examiner—John W. Rollins, Jr.
Attorney, Agent, or Firm—Vogt & O'Donnell

[57] ABSTRACT

A process for reducing the cafestol content of coffee oil in which the coffee oil is initially heated, then extracted with an aqueous isopropanol solution, after which the oil layer is separated from the aqueous isopropanol layer.

6 Claims, No Drawings

COFFEE OIL TREATMENT

The present invention relates to a process for purifying coffee oil, more particularly for reducing the content of cafestol therein.

Green coffee beans contain approximately 10–15% coffee oil, and this oil can be readily obtained from coffee beans which have been roasted, especially the spent, roasted coffee grounds which have been extracted with hot water in the preparation of soluble coffee. For example, the coffee oil may be extracted from the roasted coffee by a liquid extraction process using an organic solvent such as ether or haxane. Alternatively, and more commonly, the coffee oil is expressed from the roasted coffee by subjecting the coffee material to extreme pressure conditions. The coffee oil may be used in the form of an emulsion with coffee aroma to aromatise soluble coffee by spraying on to the soluble coffee powder. However, coffee oil contains a variety of ingredients, such as diterpene esters, an example of which is cafestol, free fatty acids and unsaponifiables, and when coffee oil is used as a carrier for coffee aroma, the presence of at least some of these ingredients causes the entire mass to become rancid in a relatively short period of time. Moreover the presence of these ingredients renders coffee oil quite dissimilar to other vegetable oils and unsuitable as an edible vegetable oil.

Methods have been described for reducing the content of diterpene esters, especially cafestol, in coffee oil but in these methods, the final coffee oil produced suffers from a lack of oxidative stability. We have found, surprisingly, that by initially heating the coffee oil and then extracting with an aqueous isopropanol solution, the cafestol content is reduced while the coffee oil possesses satisfactory oxidative stability.

According to the present invention there is provided a process in which the cafestol content of coffee oil is reduced characterised in that the coffee oil is initially heated, then extracted with an aqueous isopropanol solution, after which the oil layer is separated from the aqueous isopropanol layer.

The initial heat treatment of the coffee oil is conveniently carried out at a temperature of at least 150° C., preferably from 190° C. to 270° C. and especially from 220° C. to 260° C. The duration of the heat treatment may vary widely, for instance, from 1 minute to 6 hours. However, to achieve the optimum effect, the duration of the heat treatment is inversely proportional to the temperature. For example, the duration of the heat treatment may vary from 4 minutes to 1 hour at a temperature from 220° C. to 270° C. and from 1 hour to 3 hours at a temperature from 190° C. to 220° C., the duration of the treatment in these ranges preferably being shorter at higher temperatures. An especially preferred heat treatment is carried out at a temperature from 240° C. to 250° C. for a period of from 5 to 15 minutes.

The coffee oil may be agitated, for instance by stirring, during the heat treatment which may, if desired, be carried out in the presence of an inert gas such as nitrogen.

After the heat treatment, the coffee oil may be cooled, preferably to a temperature between 15° C. and 50° C., before the extraction with the aqueous isopropanol solution.

The isopropanol solution may contain at least 50% by weight of isopropanol, preferably from 60% to 95% and especially from 80% to 90% by weight of isopropanol based on the total weight of the solution. In the extraction, the weight ratio of the aqueous isopropanol solution to the coffee oil is conveniently at least 0.5:1, preferably from 2:1 to 10:1 and especially from 4:1 to 6:1. The temperature at which the extraction is carried out may conveniently be up to 50° C., but it is preferably from 18° C. to 27° C. The extraction is preferably carried out under conditions of agitation, for example, stirring.

The duration of the extraction may vary depending upon the requirements and may conveniently be from 5 minutes to 1 hour, preferably from 10 to 30 minutes.

After the desired extraction, the oil layer and the alcohol layer are separated.

The process of the invention may be carried out continuously if desired, wherein the coffee oil and the aqueous isopropanol solution flow countercurrently through an extraction column.

The separated oil has satisfactory oxidative stability and is of a quality comparable to edible vegetable oils and it may be subjected to further conventional technological treatments before being used as an edible vegetable oil. The separated oil may also be used for aromatising soluble coffee powder, for example by spraying on to the coffee powder in the form of an emulsion with coffee aroma.

The following Examples further illustrate the invention.

EXAMPLE 1

10 parts by volume of coffee oil were heated under a flowing nitrogen stream at 193° C. for 3 hours. Afterwards, the oil was cooled and extracted five times with an equal volume of a solvent consisting of 60% by weight of isopropanol and 40% by weight of water. After the last extraction, the oil layer was separated from the solvent layer, and it was found that the amount of cafestol that had been removed from the coffee oil was 85.0%. The coffee oil had satisfactory oxidative stability.

EXAMPLE 2

By following a similar procedure to that described in Example 1 but using a solvent consisting of 75% by weight of isopropanol and 25% by weight of water instead of the solvent there used, the amount of cafestol removed from the coffee oil was 87.4%. The coffee oil had satisfactory oxidative stability.

EXAMPLE 3

By following a similar procedure to that described in Example 1 but heating the coffee oil at 243° C. for 15 minutes instead of at 193° C. for 3 hours, the amount of cafestol removed from the coffee oil was found to be 84.9%. The coffee oil had satisfactory oxidative stability.

EXAMPLE 4

Pressed coffee oil was pumped through a flash evaporator and into a stainless steel tubing coil, immersed in an electrically heated therminol bath. The oil flowed through the coil at a rate of 70 ml/min and it was heated at 243° C. for 9.1 minutes. After the heat treatment the oil was cooled to a lower temperature before being transferred to a York-Scheibel extraction column having rotating blades and stationary discs. The coffee oil was pumped in at the top of the column at a temperature of 37° C. and flowed downwards at a rate of 20 ml/min. An aqueous isopropanol solution consisting of 90% by weight isopropanol and 10% by weight of water was introduced into the extraction column at the bottom at a temperature of 42° C. and flowed upwards at a rate of 120 ml/min. During the extraction the rotating blades rotated at 150 revolutions per minute. Extracted coffee oil containing some isopropanol solution was removed at the bottom of the column and the aqueous isopropanol solution containing the cafestol product exited at the top of the column. The low cafestol oil was separated from the isopropanol solution in an evaporator stripper and it was found that the amount of cafestol that had been removed from the coffee oil was 93.1%. The coffee oil had satisfactory oxidative stability. The aqueous isopropanol solution containing the carestol product was treated to recover the isopropanol and the recovered isopropanol from both streams was reused after adjustment of the moisture concentration.

EXAMPLE 5

By following a similar procedure to that described in Example 4 but using raw coffee oil instead of pressed coffee oil and in which the oil was pumped into the top of the column at 33° C. instead of 37° C. while the aqueous isopropanol solution was introduced into the extraction column at 43° C. instead of 42° C., a coffee oil was produced in which it was found that the amount of cafestol removed was 93.6%. The coffee oil had satisfactory oxidative stability.

EXAMPLE 6

50 parts by weight of raw oil were heated at 243° C. for 9.1 minutes. Afterwards the oil was cooled and extracted for 20 minutes at a temperature of 21° C. with 250 parts by weight of a solvent consisting of 90% by weight of isopropanol and 10% by weight of water. The mixture was then allowed to stand for 10 minutes at this temperature before separating the oil layer from the solvent layer. It was found that 94% of the cafestol had been removed from the coffee oil which had satisfactory oxidative stability.

EXAMPLE 7

By following a similar procedure to that described in Example 6 but extracting at 17° C. instead of at 21° C., the amount of cafestol removed from the coffee oil was found to be 92%. The coffee oil had satisfactory oxidative stability.

EXAMPLE 8

By following a similar procedure to that described in Example 6 but extracting at 26° C. instead of at 21° C., the amount of cafestol removed from the coffee oil was found to be 93%. The coffee oil had satisfactory oxidative stability.

I claim:
1. A process for reducing the cafestol content of coffee oil while retaining oxidative stability consisting essentially of:
   (a) heating the coffee oil to a temperature of from 150° C. to 270° C. for a period of from 1 minute to 6 hours;
   (b) sufficiently cooling the heated coffee oil to permit the addition of isopropanol;
   (c) extracting the cooled coffee oil with an aqueous isopropanol solution containing at least 50% by weight of isopropanol; and then
   (d) separating the extracted coffee oil from the aqueous isopropanol layer.
2. The process of claim 1, wherein the initial heat treatment is carried out at a temperature from 220° C. to 270° C. for a period of from 4 minutes to 1 hour.
3. The process of claim 1 or claim 2, wherein the initial heat treatment is carried out at a temperature from 240° C. to 250° C. for a period of from 5 to 15 minutes.
4. The process of claim 1, wherein the aqueous isopropanol solution contains from 80% to 90% by weight of isopropanol based on the total weight of the solution.
5. The process of claim 1, wherein, in the extraction, the weight ratio of the aqueous isopropanol solution to the coffee oil is from 4:1 to 6:1.
6. A coffee oil having reduced cafestol content and oxidative stability prepared by the process of claim 1.

* * * * *